United States Patent Office 3,369,594
Patented Feb. 20, 1968

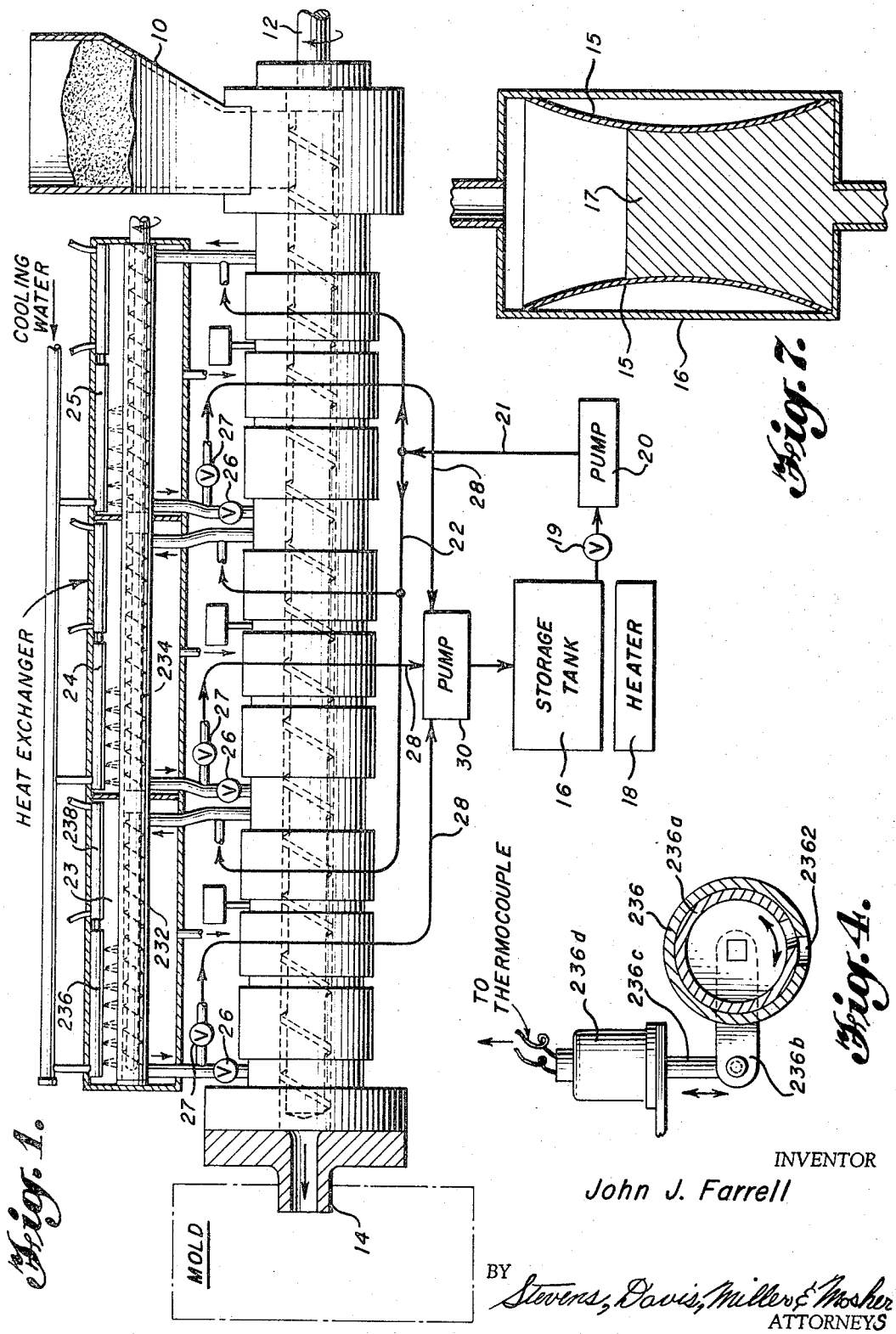

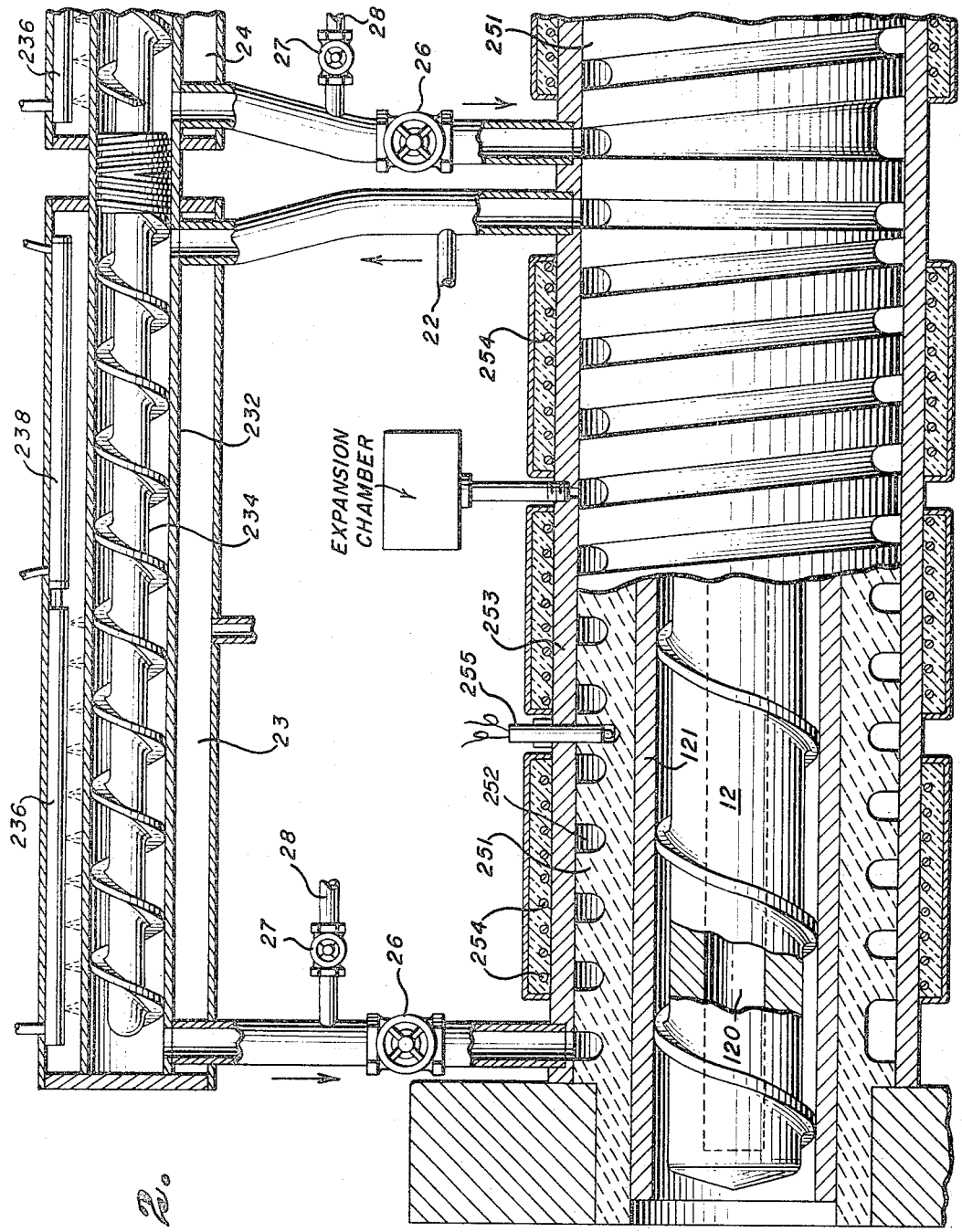

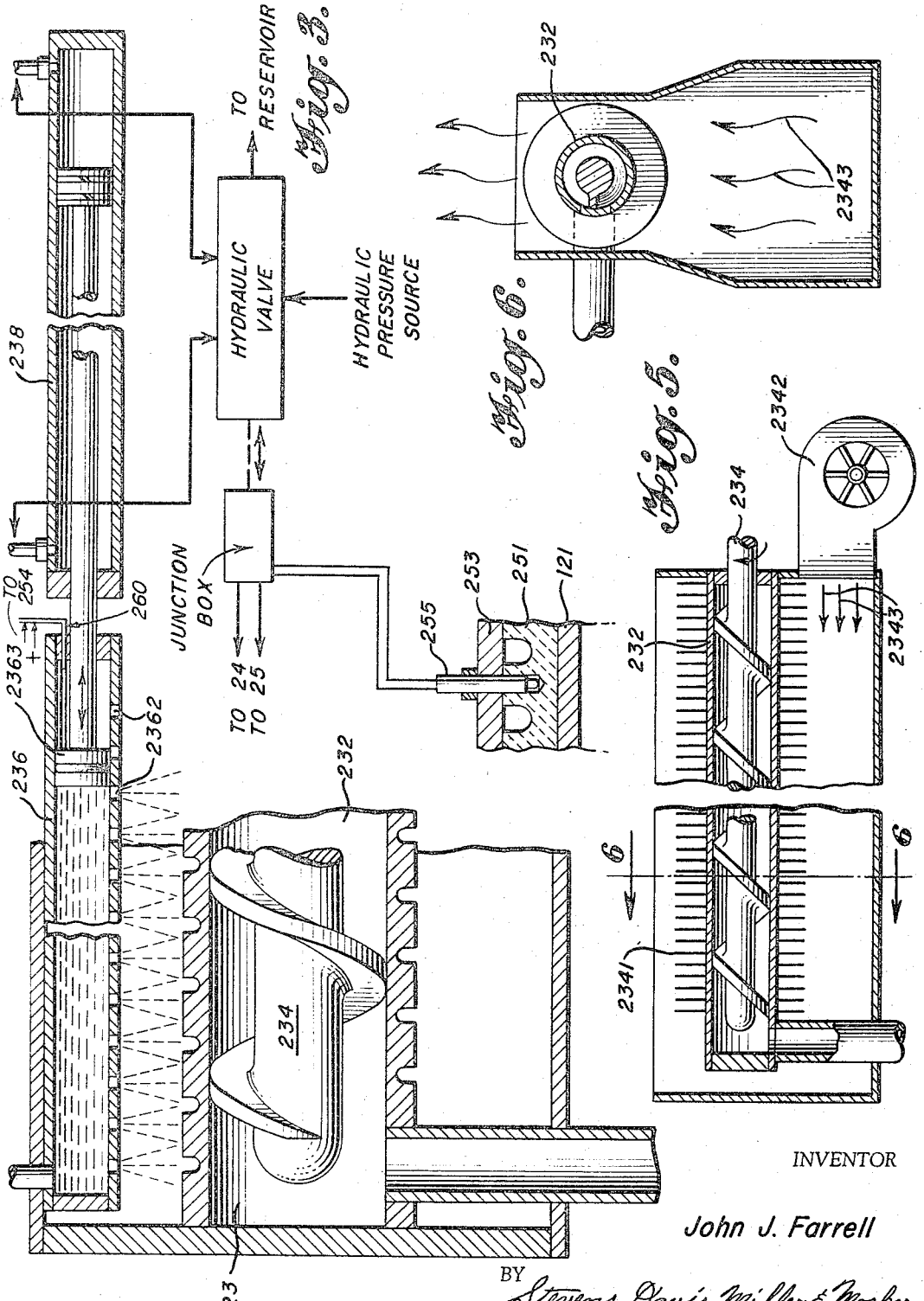

3,369,594
TEMPERATURE CONTROL APPARATUS FOR
AN EXTRUSION DEVICE
John J. Farrell, 40 Abby Lane, Greenbrook, N.J. 08812
Filed Aug. 10, 1965, Ser. No. 478,600
11 Claims. (Cl. 165—14)

ABSTRACT OF THE DISCLOSURE

A material, such as plastic, is advanced through an extrusion device. A cooling medium that is a solid under standard conditions is liquified by a heating means. The liquified cooling medium is then pumped to exchange means where the temperature of the coolant is carefully controlled. The coolant is then circulated in indirect heat exchange relation with the extrusion device. At the termination of the process, the coolant is pumped to a storage tank.

---

This invention relates to a temperature control system for a plastic extrusion device or the like. More particularly, this invention relates to a system for controlling or regulating the heat or temperature of thermoplastic and/or thermosetting types of materials in a machine designed for the processes of extrusion, injection, compression, or other molding operations.

The problem of regulating the temperature of such a device is of great concern to the art since too much heat to the thermoplastic will cause it to scorch, and too little heat will cause the machine to operate sluggishly or in an inefficient manner. The temperature regulating device herein described is used in conjunction with an extrusion device. Extrusion devices per se are old in the art and their operation is well known. Therefore, no attempt will be made herein to describe the operation of such a device. Some prior art examples of extrusion devices are seen and the patents to Hendry, 2,705,342; to Henning, 2,688,770; and to Rubin, 2,736,864. As is well known to those skilled in the art, the working temperature ranges for plastic materials in extrusion devices varies from below 400° F. to well over 600° F. Since the critical or molding temperatures varies with different plastic materials, it is essential to maintain the temperature in the extrusion machine as close to the molding temperature of the plastic material as possible for maximum or optimum efficiency.

Some cooling methods employed in the past include liquid or water jackets surrounding the moving member of the extrusion device or require the moving members to be hollowed out so that cooling liquids may flow therethrough. However, such prior art methods for cooling are not entirely satisfactory since, as the coolant flows through the extruding device, a temperature gradient is formed that results in uneven cooling.

It is therefore an object of this invention to provide a new and improved temperature controlling system for an extrusion machine.

An additional object of this invention is to provide a cooling medium with superior heat absorption qualities.

It is a further object of this invention to provide a temperature controlling system for an extrusion machine that is controllably variable.

It is still a further object of this invention to provide a cooling system with approximately even cooling throughout the extrusion device.

Other objects and improvements will become apparent in the description of the operation and in the claims seen hereinbelow.

The main feature of this invention is that the cooling medium employed is of superior heat absorption ability. In one of the embodiments disclosed, the cooling medium is a solid at room temperature. It is well known that solids in their liquid state absorb a great deal more heat than a liquid at the same temperature. Thus, a liquified solid is a more efficient coolant than is the liquid as now used in the art.

In another embodiment of this invention, water is used as the coolant. However, unlike prior art devices, the water is not allowed to flow through the extrusion device, but is allowed to vaporize and then is recondensed. Not only is greater heat absorption achieved due to the heat of vaporization, but even cooling is maintained throughout the entire length of the extrusion device.

Other advantages and features will become more apparent in the detailed description of the invention next following.

FIG. 1 illustrates partially in schematic the temperature control system for an extrusion machine;

FIG. 2 shows an enlarged view of the heat exchanger in combination with a portion of the extrusion machine of FIG. 1;

FIG. 3 shows partially in schematic the control system for automatically adjusting the temperature in the heat exchanger;

FIG. 4 shows a variation of FIG. 3;

FIG. 5 is a sectional front elevation of a pre-heating arrangement for the heat exchanger;

FIG. 6 is a sectional side elevation taken along line 6—6 of FIG. 5;

FIG. 7 is a sectional front elevation of an expandable coolant storage tank.

Figure 8:
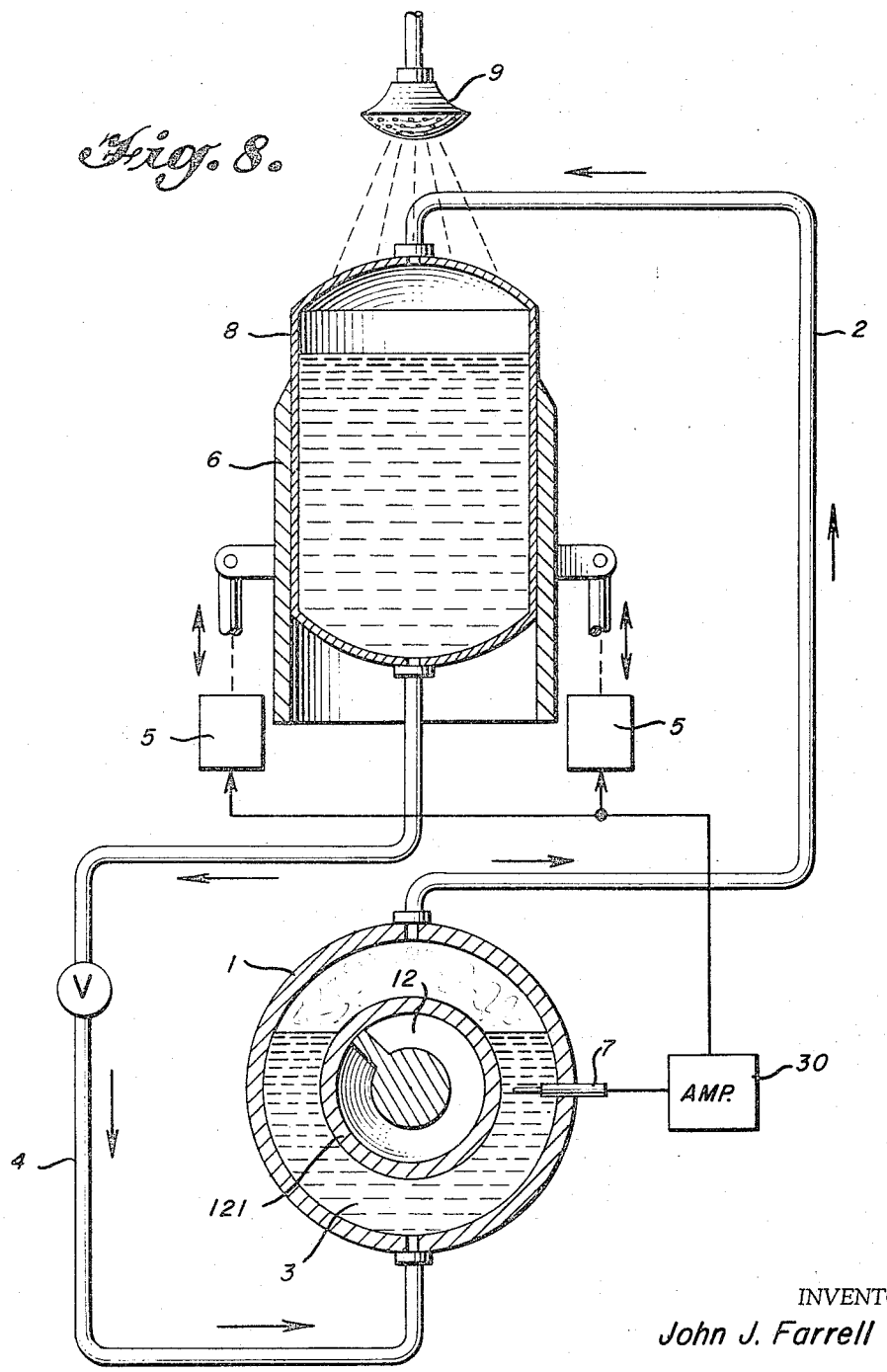
FIG. 8 shows another embodiment of the invention.

In FIG. 1, a conventional extrusion device is depicted. Plastic material shown in tank 10 feeds into the worm drive or pump of rotating member 12. Great pressure and temperature is generated during this process when the plastic material is extruded from the extrusion end 14. Storage tank 16 contains the solid substance that is to be used as the cooling medium. Metal alloys such as bismuth solder, rose metal, woods metal, and Cerro metal, trade name for cerrecast alloy, can be used as the cooling medium. Bismuth solder has a melting point of approximately 240° F. Heater 18, for example, heats storage tank 16 to approximately 300° F., enough to more than adequately liquify the solder. Pump 20 pumps the solder now liquified through valve 19 through lines 21 and 22 up to heat the exchanger which has three heat exchange sections 23, 24 and 25. Since all of the sections are similar in structure, only one section 23 will be described. Each section has an independently operating pump 234 to be more fully described below. Heat exchanger 23 either heats or cools the liquified solder depending upon the requirements of the plastic material being used in the extrusion machine. A more detailed operation of the heat exchanger 23 will be presented hereinbelow.

The now temperature-controlled liquified solder is forced from the heat exchanger through a portion of the extrusion machine via valve 26. The temperature controlled liquified solder circulates between the three heat exchangers and that portion or section of the extrusion machine associated therewith. Thus, optimum efficiency of the extrusion machine is obtained by a combination of the superior heat absorption quality of the liquified solder or other liquified alloy, and the carefully controlled temperature maintained by the heat exchangers. At the termination of the extrusion process, valve 26 is closed and valve 27 is opened for heat exchanger 23, and the liquified solder is pumped back to storage tank 16 through pump 30 and line 28. The same operation occurs with the other heat exchangers, their associated valves, and pump 30.

FIG. 2 shows heat exchanger 23 and a portion of the extrusion machine in greater detail. Rotating member 12 of the extrusion machine is bored, 120, for additional heating and for cooling. Sleeve 121 surrounds rotating member 12. Surrounding sleeve 121 is a spirally grooved refractory material 251 such as ceramic. Surrounding the spiral ceramic 251 is an outer sleeve 253 forming with said grooves a spiral channel 252 in which the liquified solder circulates as it cycles between this section of the extrusion machine and heat exchanger 23. Surrounding sleeve 253 are coils 254 for electrically heating the extrusion machine. Monitoring the temperature of extruder during operation is thermal coupling means 255 such as a Wheelco 297 temperature controller. The operation of thermal coupling means 255 will be described in greater detail hereinbelow.

The heart of the heat exchanger shown in FIG. 2 comprises a screw pump 234 surrounded by a water-cooled jacket 232. The speed of pump 234 is variable and can be controlled by any suitable means (not shown). Elongated and apertured water delivery pipes 236 are mounted in the heat exchanger housing and serve to deliver to the outside of jacket 232. Water delivery to pipes 236 is controlled in a manner described below. The heat exchangers are preheated to a predetermined temperature before the cooling operation begins. Preheating may be accomplished by either an electric heater through the core of the screw pump (not shown) or the heat exchanger itself surrounded by a jacket communicating with a hot air-blower. The hot air-blower and jacket combination is shown in FIGS. 5 and 6. The same numbers are used in FIGS. 2, 5 and 6 to depict correspondingly similar elements. In FIG. 5 the hot air-blower is shown as 2342. The hot air shown symbolically by arrows 2343 blows over fins 2341 shown radiating from water cooled jacket 232.

FIG. 3 shows a thermal couple and control circuit for the heat exchangers. Thermal couple 255 monitors the temperature in the extrusion device and sends electrical signals as a function of said temperature to the different heat exchangers by way of the junction box. The junction box is coupled to a hydraulic valve which controls a piston arrangement at 238. Water or other coolant is sprayed on jacket 232 through orifices 2362. The amount of water or other coolant that is sprayed is automatically controlled by piston 2363 since said piston receives its control signals from the thermal coupling means 255. Thus, if a signal is received from thermal couples 255 representing greater cooling, piston 2363 will move to unblock more orifices and thus allow more water to be sprayed on jacket 232. For most efficient results, the speed of pump 234 increases with the effective increase in the number of apertures 2346 and position of piston 2363.

The heaters 254 are controlled to overheat the extruder while at the same time the cooling system lowers the temperature down to the desired value. This eliminates the on-off band control normally found in present heaters in the art. In the event an influx of frictional heat is experienced which tends to increase the extruder's temperature above preset level, a switch 260 (FIGURE 3) actuated for example by a piston 2363 which cuts off heater 254. Heaters 254 remain de-energized until the extruder temperature falls below down to the preset limit.

FIG. 4 shows a modification of the cooling control for the heat exchanger. Instead of blocking and unblocking orifices, the area of the orifices themselves is controlled. Thus, as seen in FIG. 4, all of the orifices 2362 may be blocked or unblocked or assume any area opening therebetween by rotation of inner sleve 236a. This is accomplished by mechanically coupling sleeve 236a to a motor means 236d by way of coupling members 236b and 236c.

FIG. 7 shows a cross-sectional view of storage tank 16. Since the cooling medium is a solid at room temperatures, there is a great deal of expansion and contraction upon heating and cooling. Thus, in storage tank 16, diaphragms 15 are provided to allow for this expansion and contraction of medium 17.

FIG. 8 shows another embodiment of the invention; the cooling system for the extrusion machine employs a liquid medium for its coolant. The cooling control system shown in FIG. 8 employs the steam vaporization condensaiton cycle, and the liquid medium is water. Again, moving member 12 of the extrusion machine rotates about or inside casing 21. However, surrounding casing 21 is another casing or jacket 1. Water from tank 8 is allowed to flow through pipe 4 and into area 3 between the two casings 1 and 21. Due to the heat generated by the extrusion machine, steam is formed and is piped to tank 8 via pipe 2. The temperature of the water is sensed by thermal couple 7 and the electrical signals are amplified at 30 and transmitted to motor means 5. Depending upon the signals received, motor means 5 will raise or lower casing 6 surrounding tank 8. An increase in area of tank 8 exposed allows for greater amount of cooling of tank 8 by water that is sprayed from spraying means 9. So, with casing 6 completely lowered, tank 8 is totally exposed to spray from water sprayer 9 and maximum cooling is achieved for tank 8. Thus, with more cooling of tank 8, the condensation rate will exceed the vaporization rate, and the water level in area 3 will correspondingly be raised for greater even cooling. Greater cooling control and heat absorption is obtained by this method since, as is well known, a great deal of heat can be absorbed in converting water to steam without any change in the water temperature.

While the above describes the preferred embodiments of the invention, it will be understood that various changes and modifications may be made without departing from the spirit and scope of the present invention.

What is claimed is:

1. In an extrusion apparatus including a feeder for advancing material to an extrusion end, a temperature control system for cooling the feeder without thermal shock or dimensional changes resulting from excessive temperature gradients, said control system including a chamber in heat-exchange relation with said feeder, a cooling medium that is solid under standard conditions but liquid at the intended operating temperature of the feeder, means for heating the normally solid medium to liquification, heat-exchanging means remote from the chamber, passages communicating with the chamber and through which the cooling medium circulates from the chamber to the heat-exchanging means and back to the chamber, pump means for circulating the liquified cooling medium and for controlling the rate of forward progress of the liquified medium through said heat-exchanging means and through said chamber, means for controlling the temperature of said cooling medium in said heat-exchanging means as the liquified medium progresses through said heat-exchanging means.

2. The system as claimed in claim 1 wherein there is a storage tank in which said normally sodium medium is initially disposed, such storage tank containing at least an inner portion of flexible material to allow for expansion and contraction due to heating and cooling respectively of said medium.

3. The device as claimed in claim 1 wherein said heat exchanging means includes means for pre-heating said heat exchanging means.

4. The system as claimed in claim 1 wherein said medium is solder.

5. The extrusion apparatus described in claim 1 characterized by the feeder having a passage with a side wall along which material is advanced to the extrusion end, the chamber in heat-exchange relation with the feeder being formed at least partially by said side wall of the feeder passage, and said side wall being a conductor of heat.

6. The apparatus as claimed in claim 1 wherein the feeder passage is cylindrical and includes a mechanical element which advances the material along the passage, and the cooling chamber is departmentalized in different departments along the length of the feeder passage independently supplied with cooling medium for obtaining uniform cooling along the feeder with the resulting maintenance of the dimension of the feeder passage and the close fit of the element which advances the material along the passage.

7. In an extrusion apparatus including a feeder for advancing material to an extrusion end, a temperature control system for controlling the temperature in the feeder comprising means for heating a normally solid medium to liquification, heat-exchanging means, pump means for causing the liquified medium to be pumped to the heat-exchanging means, pumping means within said heat-exchanging means for controlling forward progress of said liquified medium through said heat-exchanging means, means for controlling the temperature of said cooling medium in said heat-exchanging means as said liquified medium progresses through said heat-exchanging means, a chamber in heat-exchange relation with the feeder, and means connecting the heat-exchanging means with said chamber and through which said liquified medium is supplied to said chamber for flow therethrough and other means connected with another part of the chamber for flow of liquid from the chamber back to the heat-exchanging means, and wherein said pumping means for the heat-exchanging means is a screw pump.

8. The system described in claim 7 wherein the heat-exchanging means includes a passage through which the medium flows, a heat-conducting wall of said passage, said means for controlling the temperature of said medium in said heat-exchanging means including a cooling medium supply with orifices through which a coolant flows into contact with the heat-conducting wall on the side of the wall opposite to that which touches the medium in said passage, a thermal-couple controlled hydraulic piston moving through a cylinder containing at least a row of said orifices.

9. In an extrusion apparatus including a feeder for advancing material to an extrusion end, a temperature control system for controlling the temperature in the feeder comprising means for heating a normally solid medium to liquification, heat-exchanging means, pump means for causing the liquified medium to be pumped to the heat-exchanging means, pumping means within said heat-exchanging means for controlling forward progress of said liquified medium through said heat-exchanging means, means for controlling the temperatsre of said cooling medium in said heat-exchanging means as said liquified medium progresses through said heat-exchanging means, a chamber in heat-exchange relation with the feeder, and means connecting the heat-exchanging means with said chamber and through which said liquified medium is supplied to said chamber for flow therethrough and other means connected with another part of the chamber for flow of liquid from the chamber back to the heat-exchanging means, and wherein said means for controlling the temperature of said medium in said heat-exchanging means comprises a thermo-coupled controlled motor, two concentrically disposed cylinders having relative movement, each of said cylinders containing at least a row of orifices that may at one point of time be superimposed upon one another such that the area of the orifices in one of said cylinders can be controlled by the movement of the other of said cylinders, a motor, and motion-transmitting connections between the motor and at least one of the cylinders.

10. A temperature controlled system for a plastic extrusion device or the like comprising; a cooling liquid having a first and second physical state corresponding to a given temperature range, a jacket means surrounding said device but with sufficient space for said cooling liquid disposed thereinbetween, condensing tank means, a first piping means to pipe said liquid in a vapor state from said jacket means to said condensing tank means, means including a cooling spray for cooling said condensing tank, means for controlling the area of said tank that is exposed to said cooling spray, motor means, motion-transmitting connections between the motor means and said means for controlling the area of said tank, and second piping means to pipe said liquid in a liquid state from said tank means back to said jacket means.

11. The temperature control system described in claim 10, characterized by the means for controlling the area of the tank being a cover that moves into different positions to cover more or less of the tank and to protect the covered portion from contact with the cooling spray.

References Cited

UNITED STATES PATENTS

| | | | |
|---|---|---|---|
| 2,338,691 | 1/1944 | Tucker | 165—180 |
| 2,484,542 | 10/1949 | Atwood | 165—47 |
| 2,508,988 | 5/1950 | Bradley | 165—30 |
| 2,549,569 | 4/1951 | Bradley | 165—30 |
| 2,644,312 | 7/1953 | Woods et al. | 165—106 X |
| 2,813,698 | 11/1957 | Lincoln | 165—105 |
| 3,154,140 | 10/1964 | Esselman et al. | 165—106 |

FOREIGN PATENTS 862,063   11/1940   France.

MEYER PERLIN, *Primary Examiner.*
ROBERT A. O'LEARY, *Examiner.*
M. A. ANTONAKAS, *Assistant Examiner.*

UNITED STATES PATENT OFFICE
CERTIFICATE OF CORRECTION

Patent No. 3,369,594                        February 20, 1968

John J. Farrell

It is certified that error appears in the above identified patent and that said Letters Patent are hereby corrected as shown below:

Column 4, line 54, for "sodium" read -- solid --.

Signed and sealed this 24th day of June 1969.

(SEAL)
Attest:

Edward M. Fletcher, Jr.                 WILLIAM E. SCHUYLER, JR.
Attesting Officer                             Commissioner of Patents